US009119147B2

(12) United States Patent
Duan et al.

(10) Patent No.: US 9,119,147 B2
(45) Date of Patent: Aug. 25, 2015

(54) METHOD AND DEVICE FOR REALIZING ENERGY SAVING IN COMMUNICATION SYSTEM

(71) Applicant: Huawei Technologies Co., Ltd., Shenzhen, Guangdong (CN)

(72) Inventors: Xiaoming Duan, Shenzhen (CN); Mingyi Deng, Shenzhen (CN); Ziyan Liu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 236 days.

(21) Appl. No.: 13/927,965

(22) Filed: Jun. 26, 2013

(65) Prior Publication Data

US 2013/0288658 A1 Oct. 31, 2013

Related U.S. Application Data

(63) Continuation of application No. PCT/CN2011/085097, filed on Dec. 31, 2011.

(30) Foreign Application Priority Data

Dec. 31, 2010 (CN) .......................... 2010 1 0624350

(51) Int. Cl.
  *H04W 52/02* (2009.01)
  *H04W 24/02* (2009.01)
  *H04W 84/04* (2009.01)

(52) U.S. Cl.
  CPC .......... *H04W 52/0206* (2013.01); *H04W 24/02* (2013.01); *H04W 84/045* (2013.01); *Y02B 60/50* (2013.01)

(58) Field of Classification Search
  CPC ............ H04W 52/02; H04W 52/0219; H04W 72/005; H04W 84/18; H04W 84/045; H04W 88/08; H04W 52/0274
  See application file for complete search history.

(56) References Cited

U.S. PATENT DOCUMENTS 6,701,132 B1   3/2004   Fukuzawa et al.
6,834,085 B1   12/2004  Leonowich et al.
(Continued)

FOREIGN PATENT DOCUMENTS

CN   1946199 A      4/2007
CN   101496309 A    7/2009
(Continued)

OTHER PUBLICATIONS

Written Opinion of the International Searching Authority in corresponding PCT Patent Application No. PCT/CN2011/085097 (Apr. 12, 2012).

(Continued)

*Primary Examiner* — Quan M Hua
(74) *Attorney, Agent, or Firm* — Leydig, Voit & Mayer, Ltd.

(57) ABSTRACT

A method for energy saving in communication system, where a base station enters idle state if no residence of user equipment is detected in a cell, comprises: receiving, by the base station in idle state, a response signal from user equipment after receiving a paging signal sent by the base station with a period N times a length of a radio frame; switching, by the base station, to active state. An energy saving base station and a microcell access gateway are also disclosed. Since the method is independent of whether a user equipment has been sent a signal to a macro network, application scope is enlarged. Since whether to enter active state is determined according to the feedback of user terminal, whether there is residence of user equipment in the microcell can be sensed more accurately, improving accuracy of state switching and reliability of smart energy saving of the microcell.

8 Claims, 6 Drawing Sheets

(56) References Cited

U.S. PATENT DOCUMENTS

| | | |
|---|---|---|
| 2002/0159584 A1 | 10/2002 | Sindalovsky et al. |
| 2007/0066329 A1 | 3/2007 | Laroia et al. |
| 2008/0316991 A1 | 12/2008 | Liu et al. |
| 2010/0002614 A1* | 1/2010 | Subrahmanya ............... 370/311 |
| 2010/0056184 A1* | 3/2010 | Vakil et al. ................. 455/456.5 |
| 2010/0208636 A1* | 8/2010 | Kim et al. .................... 370/311 |

FOREIGN PATENT DOCUMENTS

| | | |
|---|---|---|
| CN | 101888674 A | 11/2010 |
| CN | 102083182 A | 6/2011 |
| WO | WO 03069919 A2 | 8/2003 |
| WO | WO 2007059651 A1 | 5/2007 |
| WO | WO 2008060879 A2 | 5/2008 |
| WO | WO 2010071347 A2 | 6/2010 |
| WO | WO 2010151186 A1 | 12/2010 |

OTHER PUBLICATIONS

International Search Report in corresponding PCT Patent Application No. PCT/CN2011/085097 (Apr. 12, 2012).

$1^{st}$ Office Action in corresponding Chinese Patent Application No. 201010624350.7 (Oct. 10, 2012).

$2^{nd}$ Office Action in corresponding Chinese Patent Application No. 201010624350.7 (Jun. 3, 2013).

Ashraf, "Idle Mode Procedures for Improving Energy-Efficiency of Femtocells," Jan. 2010, Alcatel-Lucent, Paris, France.

* cited by examiner

METHOD AND DEVICE FOR REALIZING ENERGY SAVING IN COMMUNICATION SYSTEM

CROSS-REFERENCE TO RELATED APPLICATIONS

This application is a continuation of International Patent Application No. PCT/CN2011/085097, filed on Dec. 31, 2011, which claims priority to Chinese Patent Application No. 201010624350.7, filed on Dec. 31, 2010, both of which are hereby incorporated by reference in their entireties.

TECHNICAL FIELD

The present disclosure relates to the field of communication technologies and, in particular, to a method and a device for realizing energy saving in a communication system.

BACKGROUND

A microcell-based indoor communication has a character that there is a great difference between the communication traffic during the day and the communication traffic at night. Besides, a communication requirement does not always exist since the coverage of a microcell is small. Therefore, how to realize smart energy saving in a microcell is becoming one of the main research subjects of environmentally-friendly communication technologies.

The prior art provides an energy saving solution of an indoor Femto Cell (Femto Cell) AP (Access Point) based on noise power detection.

The Femto Cell AP and a macrocell base station work on different frequency bands. The Femto Cell AP can deem a signal that is sent from a user equipment to a macro network as noise, and judge whether there is a user residing in the Femto Cell using noise power detection technology. If detecting that the transmission power of the user equipment is higher than a preset noise power detection threshold, then the Femto Cell AP switches from an idle state to an active state; otherwise, the Femto Cell AP stays in the idle state. Being in the idle state means that the Femto Cell AP sends no pilot signal, and being in the active state means that the Femto Cell AP sends pilot signals.

During implementing the present disclosure, the inventor finds that the prior art has at least the following problems:

The application scope of the above smart energy saving solution of the Femto Cell based on noise power detection is limited. When the Femto Cell is not covered by a macrocell, energy saving of the Femto Cell cannot be realized according to the above energy saving solution. Besides, when interference of the exterior noise is large, the Femto Cell AP may be mis-activated since the detected exterior noise is high, and thus, energy saving cannot be realized actually.

SUMMARY

Embodiments of the present disclosure provide a method and a device for realizing energy saving in a communication system, so as to decrease energy consumption of a microcell base station effectively.

In order to achieve the foregoing objective, embodiments of the present disclosure adopt the following technical solutions.

A method for realizing energy saving in a communication system, wherein a base station enters an idle state if no residence of user equipment is detected in a cell, the method comprising:

receiving, by the base station in the idle state, a response signal sent from a user equipment, wherein the response signal is sent after the user equipment receives a paging signal sent by the base station with a period that is N times a length of a radio frame; and switching, by the base station, to an active state.

An energy saving base station, wherein the base station enters an idle state if no residence of user equipment is detected in a cell, the base station comprising:

an information receiving module, configured to receive a response signal sent from a user equipment and to trigger a state switching module, wherein the response signal is sent after the user equipment receives a paging signal sent by the base station with a period that is N times a length of a radio frame; and the state switching module, configured to switching the base station to an active state.

A microcell access gateway, comprising:

a request receiving module, configured to receive activation request information sent by a microcell base station, wherein the activation request information is used to request activating all base station in cells that neighbor a cell of the microcell base station; and an activation indicating module, configured to cause a base station in a cell that neighbors the cell of the microcell base station to switch to an active state.

It can be seen from technical solutions according to above embodiments of the present disclosure, when implementing the technical solutions according to embodiments of the present disclosure in an indoor communication system, the microcell base station sends paging signals with a period which is N times the length of a radio frame, and triggers switching to the active state according to the response signal returned by the user equipment. Since being independent of whether or not the user equipment has sent a signal to the macro network, the above smart energy saving solutions of the microcell can be implemented in areas not covered by the macro network, and the application scope of the smart energy saving method of the microcell is enlarged. Besides, since the microcell base station determines whether or not to enter the active state directly according to the feedback of the user terminal directly, the microcell base station can sense residence of user equipment in the microcell more accurately. The accuracy of state switching is improved, and thus, the reliability of smart energy saving of the microcell is improved.

BRIEF DESCRIPTION OF THE DRAWINGS

To illustrate the technical solutions in embodiments of the present disclosure more clearly, the accompanying drawings used in the description of the embodiments are briefly described hereunder. Apparently, the accompanying drawings illustrate only some embodiments of the present disclosure, and persons skilled in the art can derive other drawings from these drawings without any creative effort.

DESCRIPTION OF EMBODIMENTS

The technical solutions in embodiments of the present disclosure are hereinafter described clearly and completely with reference to the accompanying drawings. Evidently, the described embodiments are only a part of embodiments of the present disclosure, rather than all embodiments of the present disclosure. All the other embodiments obtained by persons skilled in the art without creative efforts based on embodiments of the present disclosure shall fall within the protection scope of the present disclosure.

Figure 1:
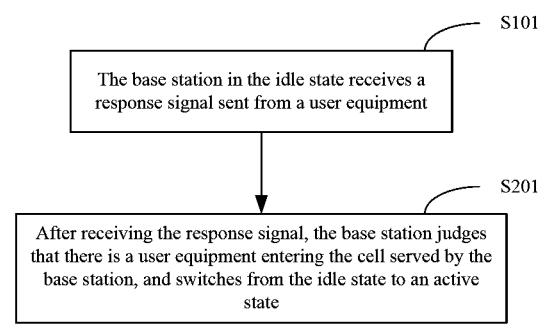
FIG. 1 is a flowchart of a method according to an embodiment of the present disclosure.

An embodiment of the present disclosure provides a method for realizing smart energy saving in a communication system. In the solution of smart energy saving, the ordinary state of a base station is the idle state. That is, the base station enters an idle state if no residence of user equipment is detected in a cell. Being in the idle state means that the base station sends no pilot signal. As to switching the station in the idle state to the active state, an embodiment of the present disclosure provides a method as shown in FIG. 1. The method includes the following operations:

S101: The base station in the idle state receives a response signal sent from a user equipment;

In an embodiment of the present disclosure, the base station periodically sends paging signals in a cell with a period that is N times the length of a radio frame. When the user equipment enters the cell and receives the paging signal, the user equipment returns the response signal to the base station.

S102: After receiving the response signal, the base station judges that there is a user equipment entering the cell served by the base station, and switches from the idle state to an active state.

In the method for smart energy saving according to an embodiment of the present disclosure, the base station senses whether there is a user equipment residing in the cell through sending paging signals periodically, and performs state switching. The method for smart energy saving according to an embodiment of the present disclosure is easy to realize and is accurate at sensing a user equipment.

The method according to the above embodiments of the present disclosure, can be implemented in an indoor communication scene based on a microcell, and also can be implemented in a macro network. When implementing an embodiment of the present disclosure in the indoor communication scene, since the coverage of the microcell is small, the base station may submit an activation request information to a microcell access gateway after switching to the active state so as to ensure continuous communication service for the user equipment, wherein the activation request information is used to request activating all base stations in neighbor cells of the base station. After receiving the activation request information, the microcell access gateway sends an activation indication information to a corresponding microcell base station to indicate the corresponding microcell base station to switch to the active state.

After the base station enters the idle state, since no residence of user equipment is detected in the cell, if the base station receives the activation indication information sent from the microcell access gateway, then the base station switches to the active state.

Certain implementations in actual applications of embodiments of the present disclosure are hereinafter described in detail.

Embodiment 1

In one embodiment, the coverage of a microcell is small and the communication traffic of the microcell is non-uniformly distributed. For example, the microcell covering a business area or a commercial area has large communication traffic during the day and very little communication traffic at night; however, the microcell covering a residential area or a hotel, and so on, has comparatively little communication traffic during the day and large communication traffic at night. In order to realize smart energy saving, a default state of the microcell base station is the idle state.

Figure 2:
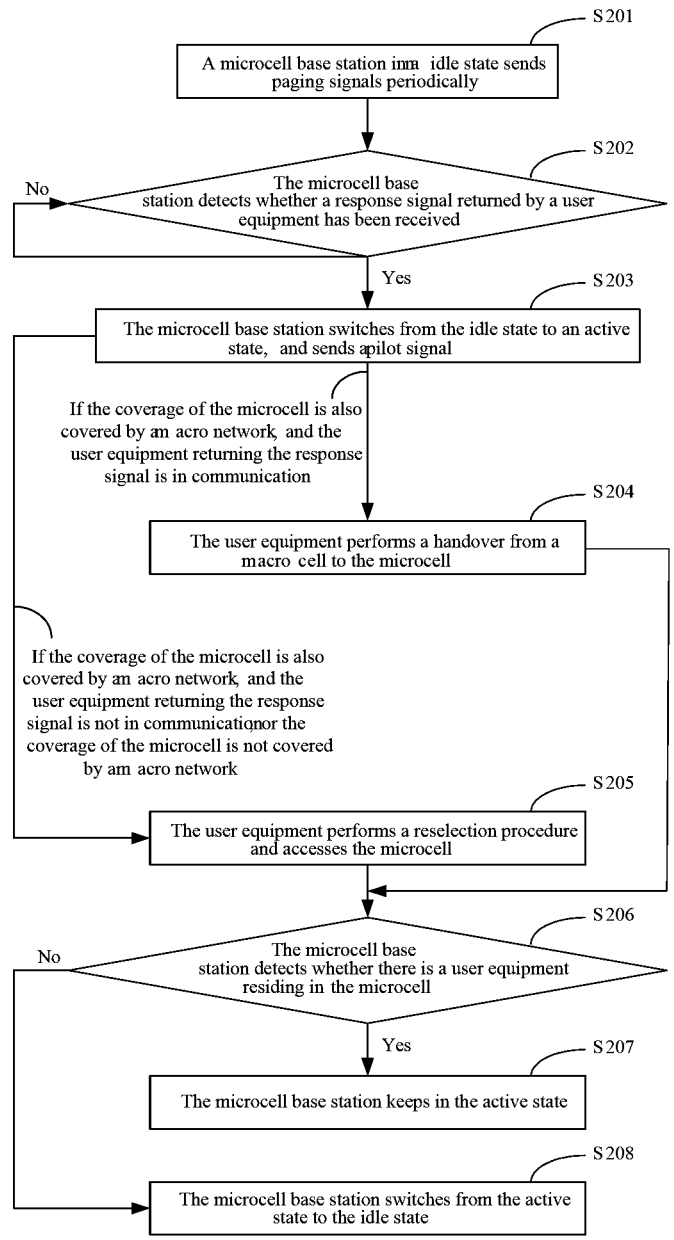
FIG. 2 is a flowchart of a method according to embodiment 1 of the present disclosure.

As shown in FIG. 2, a method for smart energy saving of a microcell base station according to embodiment 1 of the present disclosure includes the following operations:

S201: A microcell base station in an idle state sends paging signals periodically;

A period of sending paging signals Tc is N times the length of a radio frame, wherein N is a positive integer, and the specific length of Tc can be set according to actual application scene.

S202: The microcell base station detects whether a response signal returned by a user equipment has been received, and if yes, performs S203, or else, returns to perform S202 (returns to perform S202 immediately or returns to perform S202 after a preset waiting time has passed);

After receiving the paging signal, the user equipment returns the response signal to the microcell base station.

S203: The microcell base station switches from the idle state to an active state, and sends a pilot signal;

If the coverage of the microcell is also covered by a macro network, and the user equipment returning the response signal is in communication, then the method proceeds to S204, where the user equipment performs a handover from a macrocell to the microcell, and then proceeds to S206;

If, at S203, the coverage of the microcell is also covered by a macro network, and the user equipment returning the response signal is not in communication; or the coverage of the microcell is not covered by a macro network, the method proceeds to S205, where the user equipment performs a reselection procedure and accesses the microcell, and then the method proceeds to S206;

S206: The microcell base station detects whether there is a user equipments residing in the microcell. If yes, the method proceeds to S207, where the microcell base station keeps in the active state; and, if no, the method proceeds to S208, where the microcell base station switches from the active state to the idle state and, in some embodiments, the microcell base station may switch to the idle state after a preset waiting time. S206 may be performed when a periodical execution time arrived according to a preset period.

In order to ensure the paging signals sent by the microcell can be received by the user equipment successfully, the microcell base station keeps downlink frame synchronization with the macro network whose coverage overlaps the coverage of the microcell base station.

Embodiment 2

Figure 3:
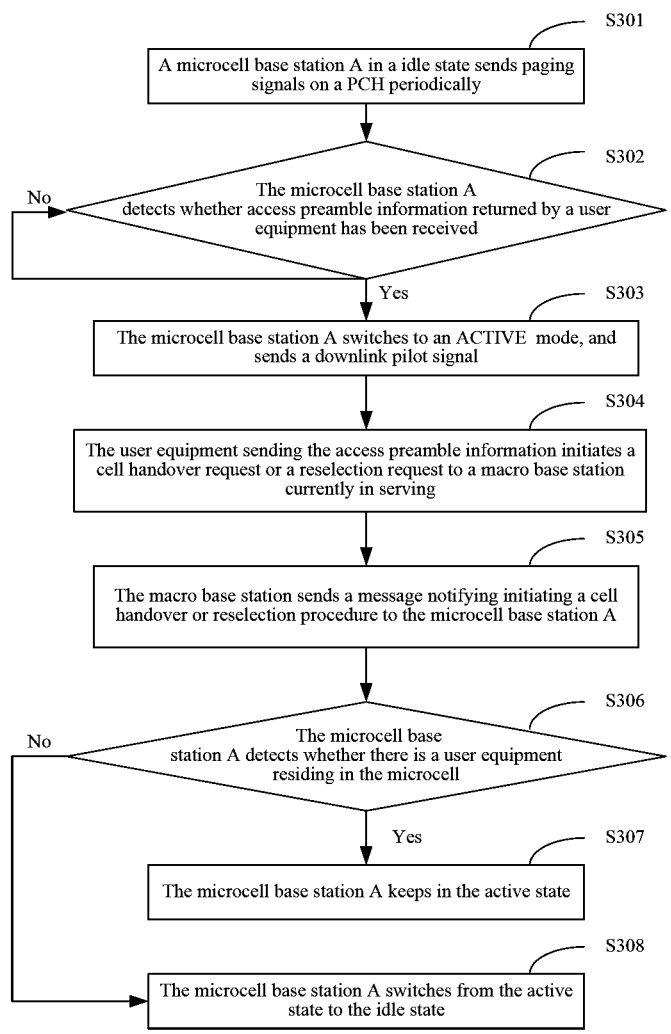
FIG. 3 is a flowchart of a method according to embodiment 2 of the present disclosure.

Embodiment 2 of the present disclosure describes a method for smart energy saving of a microcell base station in a WCDMA (Wideband Code Division Multiple Access) network. As shown in FIG. 3, the method includes the following operations:

S301: A microcell base station A in an idle state sends paging signals on a Paging Channel (PCH) periodically;

The default state of the microcell base station is an IDLE (idle) mode, and the microcell base station keeps downlink frame synchronization with a macro network.

S302: The microcell base station A detects whether access preamble information returned by a user equipment has been received and, if yes, performs S303, or else, returns to perform S302 (returns to perform S302 immediately or returns to perform S302 after a preset waiting time has passed);

After receiving the paging signal, the user equipment may return the access preamble information to the microcell base station A.

S303: The microcell base station A switches to an ACTIVE (active) mode, and sends a downlink pilot signal, and then performs S304;

S304: The user equipment sending the access preamble information initiates a cell handover request or a reselection request to a macro base station currently in serving, and then performs S305;

S305: The macro base station sends a message notifying initiating a cell handover or reselection procedure to the microcell base station A;

After finishing the cell handover or reselection procedure for the user equipment, the microcell base station A provides communication service to the user equipment entering the microcell through the handover or reselection. After finishing the above processes, S306 may be performed according to a preset period. S306: The microcell base station A detects whether there is a user equipment residing in the microcell, and, if yes, performs S307, where the microcell base station A keeps in the active state, if no, performs S308, where the microcell base station A switches from the active state to the idle state and, in some embodiments, the microcell base station A may switch to the idle state after a preset waiting time.

Embodiment 3

Figure 4:
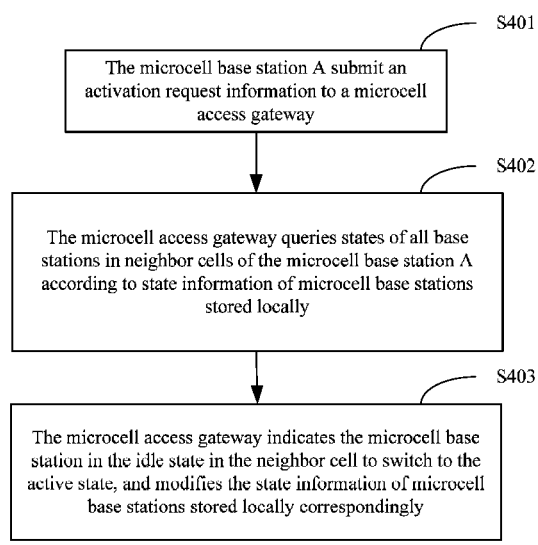
FIG. 4 is a flowchart of a method according to embodiment 3 of the present disclosure.

In one embodiments, since the coverage of a microcell is small, in order to ensure the communication service for the user equipment is continuous, the above base station may activate all base stations in neighbor cells of the above base station after switching to the active state. Such a process is described in detail in embodiment 3 of the present disclosure. As shown in FIG. 4, an implementation includes the following operations:

If the microcell base station A is activated by an access gateway, or if a user equipment initiating a communication service is detected by the microcell base station A in the active state, S401 is performed, that is, the microcell base station A submits an activation request information to a microcell access gateway;

S402: The microcell access gateway queries states of all base stations in neighbor cells of the microcell base station A according to state information of microcell base stations stored locally;

S403: The microcell access gateway indicates the microcell base station in the idle state in the neighbor cell to switch to the active state, and modifies the state information of microcell base stations stored locally correspondingly.

Embodiment 4

Figure 5:
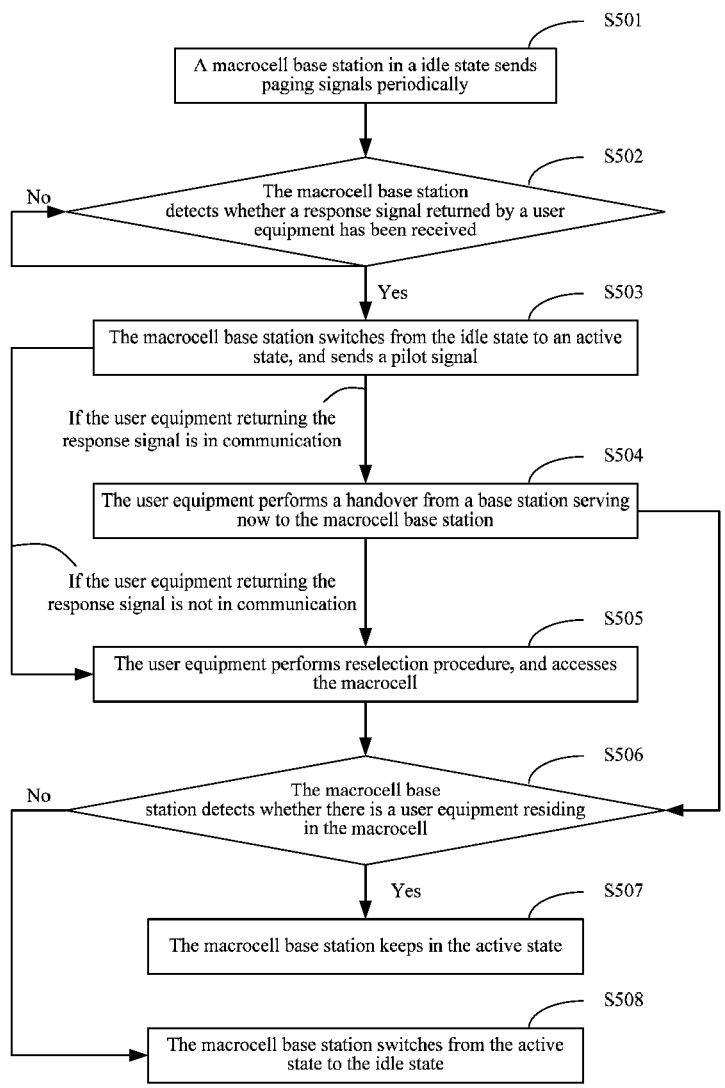
FIG. 5 is a flowchart of a method according to embodiment 4 of the present disclosure.

The method according to an embodiment of the present disclosure may be implemented in a macro network. Since the communication traffic at night is small, a macrocell base station may be set as being in the idle state at night, and sends no pilot signal. A method for smart energy saving of a macrocell base station according to embodiment 4 of the present disclosure is shown in FIG. 5. The method includes the following operations:

S501: A macrocell base station in an idle state sends paging signals periodically;

A period of sending paging signals Tc is N times the length of a radio frame, wherein N is a positive integer, and the specific length of Tc can be set according to actual application scene.

S502: The macrocell base station detects whether a response signal returned by a user equipment has been received, and, if yes, performs S503, or else, returns to perform S502 (returns to perform S502 immediately or returns to perform S502 after a preset waiting time has passed);

After receiving the paging signal, the user equipment returns the response signal to the macrocell base station.

S503: The macrocell base station switches from the idle state to an active state, and sends a pilot signal;

If the user equipment that returns the response signal is in communication, then the method proceeds to S504, where the user equipment performs a handover from a base station serving now to the macrocell base station;

If, at S503, the user equipment returning the response signal is not in communication, then the method proceeds to S505, where the user equipment performs a reselection procedure and accesses the macrocell;

After finishing the above processes, S506 may be performed according to a preset period. S506: The macrocell base station detects whether there is a user equipment residing in the macrocell, and, if yes, performs S507, where the macrocell base station keeps in the active state; if no, performs S508, where the macrocell base station switches from the active state to the idle state and, in some embodiments, the macrocell base station may switch to the idle state after a preset waiting time.

All or a part of the steps of the method according to the embodiments may be implemented by a computer program instructing relevant hardware. The program may be stored in a computer readable storage medium. When the program is executed, the steps of the method according to the embodiments are performed. The storage medium may be a magnetic disk, an optical disk, a Read-Only Memory (Read-Only Memory, ROM), a Random Access Memory (Read-Only Memory, RAM), and so on.

Figure 6:
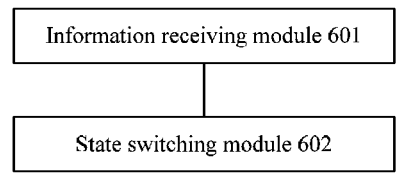
FIG. 6 is a structural diagram of a base station according to an embodiment of the present disclosure.

An embodiment of the present disclosure further provides a base station for realizing smart energy saving. The base station enters an idle state if no residence of user equipment is detected in a cell. An example structure of the base station is shown in FIG. 6. The base station includes:

an information receiving module 601, configured to receive a response signal sent from a user equipment, and trigger a state switching module, wherein the response signal is sent after the user equipment receives a paging signal sent by the base station with a period which is N times a length of a radio frame; and the state switching module 602, configured to switching the base station to an active state.

The base station according the an embodiment of the present disclosure senses whether there is a user equipment residing in the cell through sending paging signals periodically, and then performs state switching. The above solution for smart energy saving is easy to realize and is accurate at sensing a user equipment.

The base station according to an embodiment of the present disclosure further includes a paging signal sending module, which is configured to send the paging signal periodically, where the paging signal is used to return by the user equipment after receiving the paging signals, the response signal that acts as an activation indication information to the base station.

The base station, according to the above embodiments of the present disclosure, can be implemented in an indoor communication scene based on a microcell, and also can be implemented in a macro network. When employing the base station according to an embodiment of the present disclosure in the indoor communication scene, since the coverage of the microcell is small, in order to ensure that communication service of the user equipment is continuous, the base station further includes an activation requesting module, which is configured to submit an activation request information to a microcell access gateway after the base station switches to the active state, wherein the activation request information is used to request activating all base station in neighbor cells of the base station. Correspondingly, if the above base station is a microcell base station, then the state switching module is further configured to: after the base station enters the idle state, since no residence of user equipment is detected in the cell, receive an activation indication information sent from a microcell access gateway, and trigger the base station to enter the active state.

In order to ensure the paging signals sent by the base station can be received by the user equipment successfully, the base station according to an embodiment of the present disclosure may further comprise a downlink frame synchronizing module, which is configured to keep downlink frame synchronization with a macrocell base station. Wherein, the macrocell base station is a macrocell base station whose coverage is overlapped with the coverage of the base station according to embodiments of the present disclosure, or a neighbor macrocell base station of the base station according to embodiments of the present disclosure.

Figure 7:
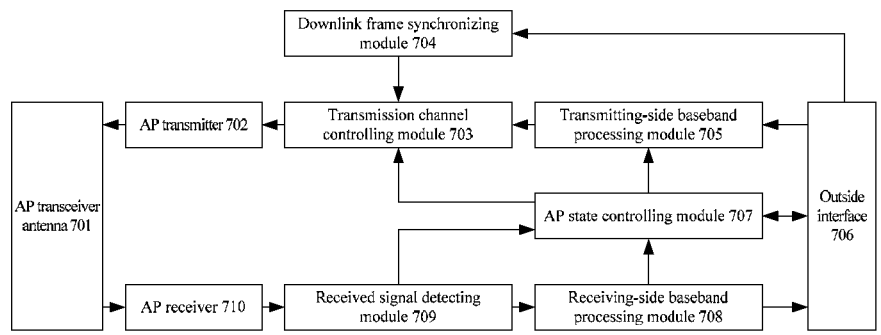
FIG. 7 is a structural diagram of a microcell base station according to an embodiment of the present disclosure.

As an example but not limitation, a structure of a specific implementation of the microcell base station according to an embodiment of the present disclosure is shown in FIG. 7. The microcell base station includes:

An AP transceiver antenna 701, configured to receive and send radio frequency signals. In one embodiment, the AP transceiver antenna is an omnidirectional-antenna.

An AP transmitter 702, configured to perform an operation, such as power amplification, radio frequency modulation, and so on, for the radio frequency signal to be sent, perform an operation for an intermediate frequency signal of the radio frequency signal to be sent, and send the operated radio frequency signal through the AP transceiver antenna. When the base station is in the idle state, the AP transmitter 702 sends paging signals periodically through an AP receiver.

An AP receiver 710, configured to perform an operation, such as filtering, synchronized receiving, radio frequency demodulation, and so on, for the radio frequency signal received by the AP transceiver, and perform an operation for the intermediate frequency signal of the received radio frequency signal.

A received signal detecting module 709, configured to detect whether a radio frequency signal is received by the AP receiver 710, and, if yes, trigger an AP state controlling module 707 to read out baseband information of a radio frequency signal.

A receiving-side baseband processing module 708, configured to perform operations, such as baseband demodulation, channel decoding, packet de-interleaving, information processing, and so on, for the radio frequency signal received by the AP receiver 710.

The AP state controlling module 707, further configured to: after receiving a trigger signal sent by the received signal detecting module 709, read out uplink information sent by the user equipment from the receiving-side baseband processing module 708, determine whether to send a pilot signal or not according to a preset algorithm, send a control instruction to a transmission channel controlling module 703 and a transmitting-side baseband processing module 705, and report a base station working state (the active state or the idle state) to the AP gateway through an outside interface 706. The AP state controlling module 707 can be further configured to send control instruction (this control instruction is used to instruct the base station to switch to the active station) to the transmission channel controlling module 703 and the transmitting-side baseband processing module 705 according to activation instruction information sent by the AP gateway.

The outside interface 706, configured to realize information interaction between the base station and the AP gateway, for example, send the frequency signal to be transmitted, which is received from the gateway, to the transmitting-side baseband processing module 705; send the activation instruction information sent by the AP gateway to the AP state controlling module 707; send the base station working state reported by the AP state controlling module 707 to the AP gateway; send the frequency signal processed by the receiving-side baseband processing module 708 to the AP gateway, and so on.

The transmitting-side baseband processing module 705, configured to: when the control instruction sent by the AP state controlling module 707 indicates opening a transmission channel, perform an operation, such as baseband modulation, channel coding, packet interleaving, channel configuring, and so on, for the frequency signal to be transmitted which is sent by the AP gateway; and when the control instruction sent by the AP state controlling module 707 indicates closing the transmission channel, do not process the pilot signal.

The transmission channel controlling module 703, configured to: when the control instruction sent by the AP state controlling module 707 indicates opening a transmission channel, open the transmission channel, and allow the AP transmitter 702 to process the pilot signal processed by the transmitting-side baseband processing module 705; and when the control instruction sent by the AP state controlling module 707 indicates closing the transmission channel, close the transmission channel, and do not allow the AP transmitter to send pilot signals.

A downlink frame synchronizing module 704, configured to control start time of a downlink frame of the base station to keep synchronous to start time of a downlink frame of a macro base station whose coverage is overlapped with the coverage of the base station, so as to ensure that the paging signal sent by the base station can be received by the user equipment.

Figure 8:
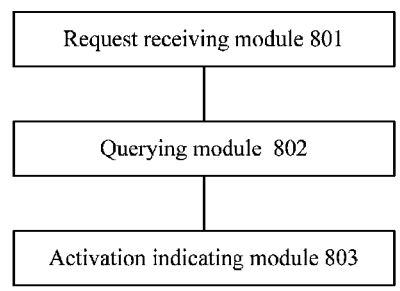
FIG. 8 is a structural diagram of a microcell access gateway according to an embodiment of the present disclosure.

An embodiment of the present disclosure further provides a microcell access gateway. An example structure of the microcell access gateway is shown in FIG. 8. The microcell access gateway includes:

a request receiving module 801, configured to receive an activation request information sent by a microcell base station, wherein the activation request information is used to request activating all base stations in neighbor cells of the microcell base station; and an activation indicating module 803 configured to indicate the base station in the neighbor cell of the microcell base station to switch to an active state.

The microcell access gateway according to an embodiment of the present disclosure further includes a querying module 802. The querying module 802 is configured to: query states of the base stations in the neighbor cells of the microcell base station according to state information of microcell base stations stored locally after the activation request information has been received by the request receiving module. Correspondingly, the activation indicating module 803 is configured to indicate a base station in an idle state to switch to an active state.

The foregoing descriptions are merely exemplary embodiments of the present disclosure, but not intended to limit the protection scope of the present disclosure. Any variation or replacement made by persons skilled in the art without departing from the spirit and principle of the present disclosure should fall within the protection scope of the present disclosure. Therefore, the protection scope of the present disclosure is subject to the protection scope of the claims.

What is claimed is:

1. A method for realizing energy saving in a communication system, wherein a base station enters an idle state if no residence of a user equipment is detected in a cell, wherein the base station is a microcell base station, the method comprising:
   receiving, by the microcell base station in the idle state, a response signal sent from the user equipment, wherein the response signal is sent after the user equipment receives a paging signal sent by the microcell base station with a period that is N times a length of a radio frame;
   switching, by the microcell base station, to an active state; and
   submitting, by the microcell base station, activation request information to a microcell access gateway, wherein the activation request information is configured to cause the microcell access gateway to query states of all base stations in the cells that neighbor a cell of the microcell base station according to state information of the base stations stored locally and to indicate a base station in an idle state to switch to an active state, such that all base stations in cells that neighbor a cell of the microcell base station are activated.

2. The method according to claim 1, wherein after the base station enters the idle state since no residence of the user equipment is detected in the cell, the method further comprises:
   receiving, by the microcell base station, activation indication information sent from the microcell access gateway; and
   switching the microcell base station to the active state.

3. The method according to claim 1, further comprising:
   keeping, by the microcell base station, downlink frame synchronization with a macrocell base station.

4. An energy saving microcell base station, wherein the microcell base station enters an idle state if no residence of a user equipment is detected in a cell, the microcell base station comprising:
   an information receiving module that includes receiver circuitry configured to receive a response signal sent from the user equipment and to trigger a state switching module, wherein the response signal is sent after the user equipment receives a paging signal sent by the microcell base station with a period that is N times a length of a radio frame;
   the state switching module, configured to switch the base station to an active state; and
   an activation requesting module configured to submit activation request information to a microcell access gateway, wherein the activation request information is configured to cause the microcell access gateway to query states of all base stations in the cells that neighbor a cell of the microcell base station according to state information of the base stations stored locally and to indicate a base station in an idle state to switch to an active state, such that all base stations in cells that neighbor a cell of the microcell base station are activated.

5. The microcell base station according to claim 4, further comprising: a paging signal sending module configured to send the paging signal periodically, wherein the paging signal is used to return, by the user equipment after receiving the paging signal, the response signal that acts as an activation indication information to the base station.

6. The microcell base station according to claim 4, the state switching module is further configured to:
   after the microcell base station enters the idle state since no residence of the user equipment is detected in the cell, receive activation indication information sent from the microcell access gateway; and
   trigger the microcell base station to enter the active state.

7. The microcell base station according to claim 4, further comprising:
   a downlink frame synchronizing module configured to keep downlink frame synchronization with a macrocell base station.

8. A microcell access gateway, comprising:
   request receiving circuitry, configured to receive activation request information sent by a microcell base station, wherein the activation request information is used to request activating all base stations in cells that neighbor a cell of the microcell base station;
   an activation indicating module, configured to cause a base station in a cell that neighbors the cell of the microcell base station to switch to an active state; and
   a querying module, configured to: after the activation request information has been received by the request receiving circuitry, query states of the base stations in the cells that neighbor the cell of the microcell base station according to state information of the base stations stored locally,
   wherein the activation indicating module is further configured to indicate a base station in an idle state to switch to the active state.

* * * * *